May 5, 1970 H. ODEN 3,510,594

ARRANGEMENT FOR AUTOMATIC ASSESSMENT OF FEES IN CONFERENCE CALL CIRCUITS

Filed May 2, 1966

United States Patent Office 3,510,594
Patented May 5, 1970

3,510,594

ARRANGEMENT FOR AUTOMATIC ASSESSMENT OF FEES IN CONFERENCE CALL CIRCUITS

Hoeckley Oden, Korntal, Wurttemberg, Germany, assignor to International Standard Electric Corporation, New York, N.Y., a corporation of Delaware Filed May 2, 1966, Ser. No. 546,880
Claims priority, application Germany, May 11, 1965, St 23,808
Int. Cl. H04m *15/18*
U.S. Cl. 179—7.1 4 Claims

ABSTRACT OF THE DISCLOSURE

An automatic fee assessment system for conference calls is shown. Counting pulses for each called subscriber are generated in an unrelated manner. The unsynchronized pulses are related to each subscriber are used to operate separate relays. The separate relays, in turn, collectively operate a logical AND gate and set another relay. The last relay remains closed, enabling establishment of total time of the call, until connections are broken to all of the called subscribers.

The invention relates to a method and to a circuit arrangement for automatic assessment of fees for multiple connections in telecommunications and particularly in telephone systems.

Multiple connections, being conference calls or call-back connections, are no problem so long as they take place in a private automatic branch exchange. But if at such a multiple connection two subscribers of the public telephone net participate problems occur in the assessment of fees. The calling subscriber must pay the fees for all connections established. But this leads to a considerable difficulty because the individual counting pulse senders in the different connecting paths operate completely at ranrom. A coincidence of fee assessment pulses from different connections in a multiple connection can, therefore, not be circumvented.

It is a primary object of the invention to provide a method and a circuit arrangement for automatic assessment of fees at multiple connections in which the number of the simultaneously participating subscribers is not limited to three and, nevertheless, in any case the fee pulses can be evaluated, clearly separated from each other, even under most unfavourable counting conditions. The method for the automatic assessment of fees at multiple connections in telecommunication, and particularly in telephone systems is, according to the invention, characterized in this that the connections are established via separate paths, starting from the link of the calling subscriber, and the fees are assessed through counting pulse senders, known per se and associated with said paths, at different times. A separation of the fee assessment pulses is achieved via separate paths and a separate counting clock pulse, independent of the number of the simultaneously established connections. Between the seized output of the link and the reached counting pulse sender a connection exists which becomes effective in the evaluation of the fee assessment pulses of this particular connection path at defined times. But an appropriate separation can be made also in the link itself.

The circuit arrangement to carry out the method according to the invention is characterized in that the links for the calling subscribers show a plurality of outputs through which various groups of counting pulse senders can be reached. Counting pulse senders of the different groups are subject to control at different times. This type of timely separation only requires different control moments for the groups of counting puse senders, which can be associated with the different outputs of the links. This association is made in the simplest way that the counting pulse senders can be connected to the different outputs of links for calling subscribers via separate switching stages.

Figure 1:
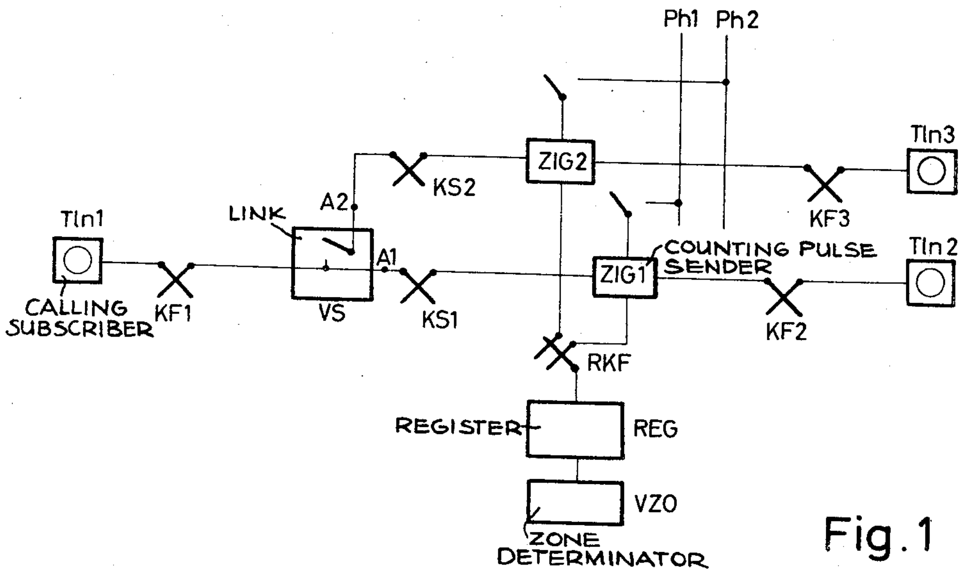
Figure 2:
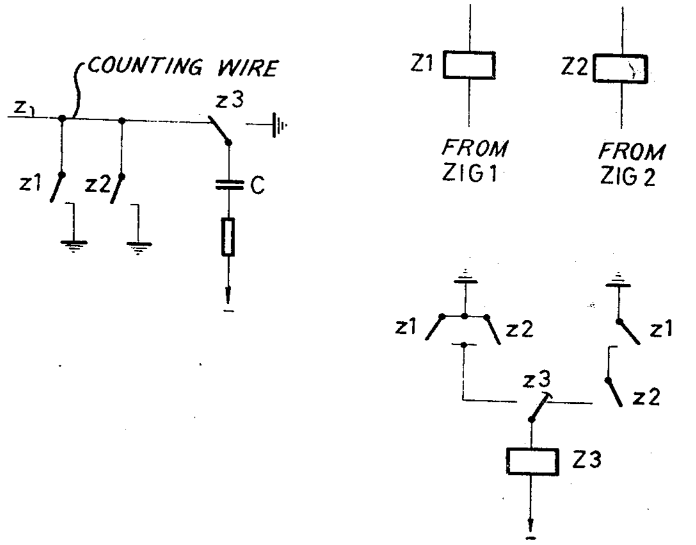

The invention is explained in detail with the aid of the accompanying drawings, wherein:

FIG. 1 shows a block diagram of a telephone system, operating according to the method of the invention, and FIG. 2 shows a circuit arrangement for a timely separation of the fee assessment pulses arriving via two connection paths, operating in the connection set.

The calling subscriber T*ln*–1 is connected with a register REG, controlling the establishment of the connection via the switching stage KF1, the link VS, the switching stage KS1, the counting pulse sender ZIG1 and the register finder grid RKF. The register REG controls, after dialling the called number, the setting of the switching stages KF2 and KF3, if e.g. a conference call is to be established. The register can establish connections between T*ln*–1 and and the subscriber T*ln*–2 and/or the subscriber T*ln*–3. The number of the subscribers to be connected in a multiple connection is not limited to three. In controlling the switching stages with the aid of the dial information items, received by the register, all variants are possible.

For fee assessment, a counting pulse sender ZIG1 or ZIG2 is inserted in each connection path. Based on the number dialled, the counting clock pulse is determined via a zone determinator VZO and forwarded to the appropriate counting pulse sender ZIG. When counting during the call—staggered to time and zone—each connecting path receives its individual counting clock pulse. All fee assessment pulses of all connecting paths come together in the seized link VS. To separate the different time periods different time signals are supplied over positions P*h*1 and P*h*2 for association with different counting pulse sender groups ZIG1 and ZIG2. An overlapping of fee assessmment pulses, therefore, cannot occur in the link VS. The counting wires of all connecting paths can be concentrated in the link VS. The fee assessment pulses arriving from the different counting pulse senders can be led directly to the automatic message accounting of the calling subscriber T*ln*–1.

As may be gathered from the block diagram according to FIG. 1, it is not difficult to group the counting pulse senders in such a way that more than two connections can be switched to a multiple connection. Centralized subdivision of the timing clock pulses for delivery at P*h*1, P*h*2, etc. for the counting pulse senders is to be recommended then, when a large portion of subscribers possess the possibility or the authorization to establish such multiple connections.

If this possibility or authorization is limited to a few subscribers, only, these subscribers can be concentrated in a group with separate links. The timely separation of the fee assessment pulses can be made in the link before they are forwarded to the message accounting of the calling subscriber.

FIG. 2 shows, in a circuit arrangement, how to separate fee assessment pulses arriving simultaneously from two connecting paths in a sequence. As indicated in FIG. 2, counting relays Z1 and Z2 receives pulses respectively from counting pulse senders ZIG1 and ZIG2. For use in assessing full charges against the calling party, both counting relays Z1 and Z2 are excited simultaneously, to cause relay Z3 to respond. A storing capacitor C is charged via a contact *z*3 of this relay. Only after both fee assessment pulses have ceased does relay Z3 drop again and the storage capacitor C discharge on the counting wire *z*. Thereby, the message accounting, or assessment of fees, may be enabled against the calling subscriber by equipment which is not illustrated.

It is not necessary that the fee assessment pulses be transmitted during the call, staggered by time and zone. It is only necessary to secure separation of the fee information items from the connecting paths participating in the multiple connection.

While the principles of the invention have been described above in connection with specific apparatus and applications, it is to be understood that this description is made only by way of example and not as a limitation on the scope of the invention.

What is claimed is:

1. A circuit arrangement for automatic fee assessment among a plurality of subscribers participating in a conference call comprising:

a calling subscriber station, at least two called subscriber stations, means, including automatic switching equipment, for separately connecting the calling subscriber to each of the called subscribers, said means including a register for controlling the establishment of a conference call, said means including a link circuit associated with the calling subscriber station, said means including a counting pulse sender for each called subscriber station, and said means including a switching stage responsive to control by the register to couple a counting pulse sender to each called line whereby each sender operates over a separate line and during a different time period to maintain distinctions between pulses.

2. A circuit arrangement as claimed in claim 1, in which the link circuit associated with the calling subscriber station has several outputs through which different counting pulse senders can be contacted.

3. A circuit arrangement as claimed in claim 2, in which the counting pulse senders are connected via separate switching stages to the different outputs of the link circuit for calling subscribers.

4. A circuit arrangement for automatic fee assessment as claimed in claim 1, in which means are provided for receiving pulses from the counting pulse sender and for forwarding them to counting relays.

References Cited

UNITED STATES PATENTS

| | | | |
|---|---|---|---|
| 3,116,369 | 12/1963 | Cox | 179—1 |
| 3,342,939 | 9/1967 | Gattner et al. | 179—7.1 |
| 3,293,369 | 12/1966 | Schroeder. | |

FOREIGN PATENTS

| | | | |
|---|---|---|---|
| 1,015,646 | 1/1966 | England. | |

KATHLEEN H. CLAFFY, Primary Examiner

J. S. BLACK, Assistant Examiner

U.S. Cl. X.R.

179—18